United States Patent
Frushour et al.

(10) Patent No.: US 6,187,068 B1
(45) Date of Patent: Feb. 13, 2001

(54) COMPOSITE POLYCRYSTALLINE DIAMOND COMPACT WITH DISCRETE PARTICLE SIZE AREAS

(75) Inventors: Robert H. Frushour, Ann Arbor; Christopher J. Torbet, Chelesa, both of MI (US)

(73) Assignee: Phoenix Crystal Corporation, Ann Arbor, MI (US)

( * ) Notice: Under 35 U.S.C. 154(b), the term of this patent shall be extended for 0 days.

(21) Appl. No.: 09/167,196

(22) Filed: Oct. 6, 1998

(51) Int. Cl.$^7$ .............. B24D 3/00; B24D 17/00; B23B 27/14; B23B 27/20
(52) U.S. Cl. .............. 51/295; 293/297; 293/307; 407/118; 407/119
(58) Field of Search .............. 51/295, 307, 297, 51/293; 407/118, 119

(56) References Cited

U.S. PATENT DOCUMENTS

| | | | |
|---|---|---|---|
| 4,109,737 | 8/1978 | Bovenkerk | 175/329 |
| 4,592,433 | 6/1986 | Dennis | 175/329 |
| 4,604,106 | 8/1986 | Hall et al. | 51/293 |
| 4,629,373 | 12/1986 | Hall | 407/118 |
| 4,784,023 | 11/1988 | Dennis | 76/108 |
| 4,866,885 | * 9/1989 | Dodsworth | 51/295 |
| 4,972,637 | * 11/1990 | Dyer | 51/295 |
| 5,007,207 | * 4/1991 | Phaal | 51/295 |
| 5,011,515 | 4/1991 | Frushour | 51/307 |
| 5,054,246 | 10/1991 | Phaal et al. | 51/204 |
| 5,355,969 | 10/1994 | Hardy et al. | 175/432 |
| 5,469,927 | 11/1995 | Griffin | 175/432 |
| 5,564,511 | 10/1996 | Frushour | 175/431 |
| 5,598,750 | 2/1997 | Griffin et al. | 76/108.2 |
| 5,645,617 | 7/1997 | Frushour | 51/309 |

* cited by examiner

Primary Examiner—Michael Marcheschi

(57) ABSTRACT

A polycrystalline diamond compact for use in cutting operations that require improved impact strength and non-uniform edge wear. The compact includes a substrate, with multiple, laterally spaced, abrasive diamond particle areas segregated by different particle sizes bonded to the substrate. The polycrystalline diamond areas formed of finer size diamond particles provide higher abrasion resistance wear at a slower rate thus producing a non-linear cutting, edge to the work zone. The areas of different average size diamond particles, in one embodiment, are arranged in concentric rings with each ring of a different particle size. Alternating rings may be formed of uniform size diamond a particles. The areas also may be in the form of spaced grooves inlaid from the end surface of polycrystalline diamond layers. The polycrystalline diamond layer may also have a non-planar end with the discrete areas radially spaced across the layer. Alternately, a plurality of depressions are formed in a working surface of the substrate, with polycrystalline diamond filling all of the depressions. At least one of the depressions is filled with polycrystalline diamond having a different average particle size than that of the diamond filling the other depression. The depressions are thus separated by barriers formed of a harder material.

13 Claims, 2 Drawing Sheets

COMPOSITE POLYCRYSTALLINE DIAMOND COMPACT WITH DISCRETE PARTICLE SIZE AREAS

BACKGROUND OF THE INVENTION

1. Field of the Invention

The present invention relates to a sintered polycrystalline diamond composite for use in rock drilling, machining of wear resistant metals, and other operations which require the high abrasion resistance or wear resistance of a diamond surface. Specifically, this invention relates to such bodies that include a polycrystalline diamond layer attached to a cemented metal carbide substrate via processing at ultrahigh pressures and temperatures.

2. Description of the Art

Composite polycrystalline diamond compacts or PCD have been used for industrial applications including rock drilling and metal machining for many years. One of the factors limiting the success of the PCD is the generation of heat due to friction between the PCD and the work material. This heat causes thermal damage to the PCD in the form of cracks which lead to spalling of the polycrystalline diamond layer, delamination between the polycrystalline diamond and substrate, and back conversion of the diamond to graphite causing rapid abrasive wear.

When the PCD cutter is new it generally has a circular geometry and so it presents a sharp cutting edge to the work material. However, after use for some time, this circular- or arc-shaped cutting edge wears into a straight flat surface that cannot as effectively penetrate the work material. When used for rock drilling, the worn PCD cutter acts as a friction bearing surface that generates heat which accelerates the wear of the PCD cutter and slows the penetration rate of the drill.

Prior art methods to solve this problem, such as discussed in U.S. Pat. No. 4,784,023 to Dennis, utilize a substrate with a non-planar surface so that the interface between the diamond and the substrate is irregular. The result is a diamond layer which has both thin and thick sections. The thicker portion of the polycrystalline diamond offers more abrasion resistance and wears at a slower rate. Failure analysis of drill bits containing PCD's with non-planar interfaces shows that the worn cutting edges of the cutters are irregular and much sharper than those of cutters made with planar interfaces. Although this has generally been shown to be an improvement, there is still an area of concern. When non-planar substrates are used, highly localized stress occurs at the interface causing cracking which can result in catastrophic failure of the cutter.

In U.S. Pat. No. 4,784,023, the disadvantage of using relatively few parallel grooves with planar side walls is that the stress becomes concentrated along the top and, more importantly, the base of each groove and results in significant cracking of the metallic substrate along the edges of the bottom of the groove. This cracking significantly weakens the substrate whose main purpose is to provide mechanical strength to the thin polycrystalline diamond layer. As a result, construction of a polycrystalline diamond cutter following the teachings provided by U.S. Pat. No. 4,784,023 is not suitable for cutting application where repeated high impact forces are encountered, such as in percussive drilling, nor in applications where extreme thermal shock is a consideration.

Other configurations have been proposed in order to overcome problems of stress in the compact due to the mismatch in thermal expansion between the diamond layer and the tungsten carbide substrate. For example, U.S. Pat. No. 5,351,772 describes the use of radially extending raised lands on one side of the tungsten carbide substrate area on which a polycrystalline diamond table is formed and bonded.

U.S. Pat. No. 5,011,515 describes a substrate with a surface topography formed by irregularities having non-planar side walls such that the concentration of substrate material continuously and gradually decreases at deeper penetrations into the diamond layer. U.S. Pat. No. 5,379,854 describes a substrate with a hemispherical interface between the diamond layer and the substrate, the hemispherical interface containing ridges that penetrate into the diamond layer. U.S. Pat. No. 5,355,969 describes an interface between the substrate and polycrystalline layer defined by a surface topography with radially-spaced-apart protuberances and depressions.

All of the above proposals show a diamond layer of varying thickness relative to the surface of the tungsten carbide substrate support. Thus, in areas where the diamond layer is thicker, the amount of cobalt available is less than in those areas where the diamond layer is thin. This results in a non-uniformly sintered diamond layer that substantially weakens the compact. Even when cobalt powder is pre-mixed with the diamond prior to subjecting the compact to high pressure-high temperature conditions, the presence of cobalt in a substrate with a textured surface produces areas of varying concentration of cobalt within the diamond layer during the sintering process and causes soft spots or poorly sintered areas within the diamond layer.

A number of patents have been issued that propose the use of transitional layers to better sinter the diamond and improve the adhesion of the polycrystalline diamond to the substrate.

One of the solutions to these problems is proposed in U.S. Pat. No. 4,604,106. This patent utilizes one or more transitional layers incorporating powdered mixtures with various percentages of diamond, tungsten carbide, and cobalt to distribute the stress caused by the difference in thermal expansion over a larger area. A problem with this solution is that the cobalt cemented carbide in the mixture weakens that portion of the diamond layer because less diamond-to-diamond direct bonding occurs as a result of the carbide second phase.

U.S. Pat. No. 4,311,490 teaches the use of coarse diamond particles next to the tungsten support with a layer of finer diamond particles placed on top as the exposed cutting surface. This is reported to reduce the occurrence of soft spots or poorly sintered areas in the diamond table since the coarser particles have larger channels between them making it easier for cobalt to sweep through the diamond nearest the tungsten carbide substrate, thus allowing thicker diamond layers to be sintered. For rock drilling applications, however, it has been found that although finer diamond results in higher abrasion resistance, it also results in significantly less impact resistance. The lower impact resistance produces compact cutter failure by way of fracturing and spalling of the diamond layer from the tungsten carbide support substrate.

U.S. Pat. No 5,645,617 also uses layers of diamond with different average particle sizes.

The problem with the layer designs is that they do not provide a means to cause irregular wear of the cutting edge and thus do not eliminate the problem of formations of a relatively large wear flat. Thus, it would be useful to have a means to control the geometry of the cutting edge and at the same time limit the stress caused by using non-planar interfaces.

SUMMARY OF THE INVENTION

The instant invention is a polycrystalline diamond compact that has at least two areas of abrasive crystals or diamond of different average crystal size in each separate area wherein the areas describe a different lateral location on the surface of the compact so that the average diamond particle size varies laterally in discrete areas across the compact. These areas may be directly adjacent to one another or separated by tungsten carbide or other hard material. The areas may be over-coated or undercoated by another layer of polycrystalline diamond composed of crystals of uniform size.

A cross section of a cutter of this invention presents an area or edge to the work material that has non-uniform wear characteristics which prevents formation of a large wear flat on the compact which would reduce the compacts ability to cut.

Applying the principles of this invention to a compact with a domed or curved surface allows placement of the larger diamond crystals in the impact zone of the compact and placement of the smaller diamond crystals in the area of the compact that receives mostly abrasive wear.

This invention may be used to enhance the performance of compacts that have either planar or non-planar interfaces between the polycrystalline diamond and the tungsten carbide substrate. The severity of the non-planar interface may be reduced by incorporation of polycrystalline diamond areas with different average particle sizes to control the shape of the cutting edge.

This invention differs from prior art methods of layering diamond with different average particle sizes as described in U.S. Pat. No. 4,311,490 and U.S. Pat. No. 5,645,617. These prior art patents describe compacts wherein the substrate is successively coated with layers of polycrystalline diamond of uniform thickness, each layer having a different average particle size of diamond. Whereas, in this invention, a cross sectional view of the PCD would show non-uniform thickness for the polycrystalline diamond which is composed of the same average particle size crystals.

The polycrystalline diamond areas formed of the finer size diamond particles provide a higher abrasion resistance and a slower wear rate thus producing a non-linear cutting edge to the work zone. Additionally, the division of the cutting face into areas of different sized diamond particles provides barriers to crack propagation thus limiting premature failure of the cutter in high impact situations.

BRIEF DESCRIPTION OF THE DRAWING

The various features, advantages and other uses of the present invention will become more apparent by referring to the following detailed description and drawing in which.

DETAILED DESCRIPTION OF THE PREFERRED EMBODIMENT

In the following description, it should be understood that the crystal areas described hereafter as formed of polycrystalline diamond, PCD, or sintered diamond as the material is often referred to in the art, can also be any of the super hard abrasive materials, including but not limited to, synthetic or natural diamond, cubic boron nitride, and wurzite boron nitride as well as combinations thereof.

Figure 1:
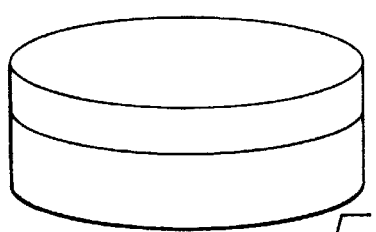
FIG. 1 is a perspective view of one prior art polycrystalline diamond compact.
Figure 2:
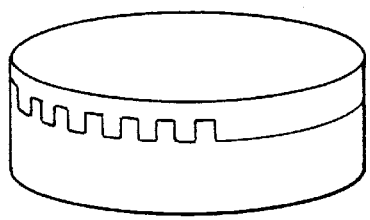
FIG. 2 is a perspective view of a second prior art polycrystalline diamond compact.
Figure 3:
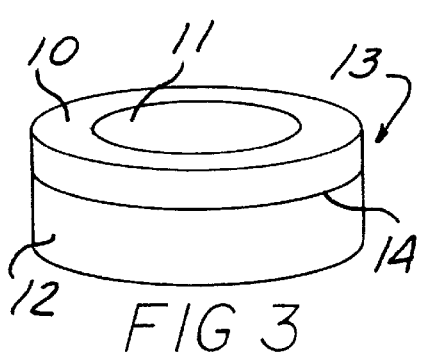
FIG. 3 is a perspective view of the first embodiment of a polycrystalline diamond compact according to the present invention.

FIG. 3 shows a first embodiment of the invention which includes at least two concentric, annular rings 10 and 11 which constitute the polycrystalline diamond layer. The outer ring 10 is formed of polycrystalline diamond with an average particle size less than that of polycrystalline diamond in an inner ring or core 11. Alternately, the outer ring 10 could have an average diamond particle size greater than that of the inner ring or core 11. Both of the polycrystalline diamond areas 10 and 11 are supported by a substrate 12 to form the compact or cutting element 13.

The substrate 12 is preferably formed of a hard metal. In a specific example, the substrate 12 is formed of a metal carbide selected from the group consisting of tungsten carbide, titanium carbide, tantalum carbide, and mixtures thereof. The substrate 12 may also be formed of a carbide from the group of IVB, VB, or VIB metals which is pressed and sintered in the presence of a binder of cobalt, nickel, iron, and alloys thereof.

Figure 4:
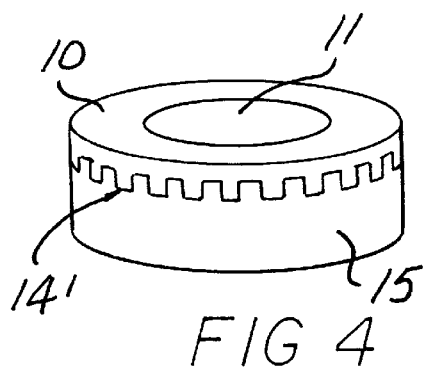
FIG. 4 is a perspective view showing a modification to the compact of FIG. 3.

In FIG. 3, the interface 14 between the polycrystalline diamond areas 10 and 11 and the substrate 12 has a planar or flat configuration. In FIG. 4, the substrate 15 is formed with a plurality of equally spaced, generally parallel grooves to form the diamond/carbide interface 14'. The grooves may be straight sided as shown in FIG. 4 or formed with angled side walls which are disposed at acute or oblique angles with respect to the plane of substrate 15. Other nonflat surface irregularities may also be employed at the interface 14'. Interfaces with any of the other surface topographies known in the art may also be employed.

Figure 5:
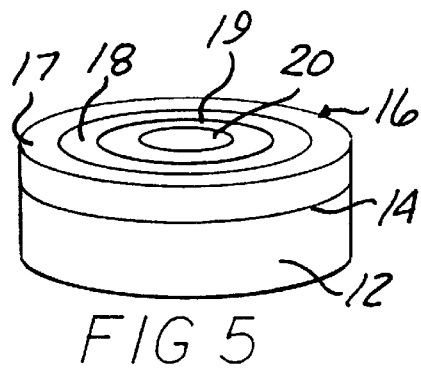
FIG. 5 is a perspective view of a second embodiment of a polycrystalline diamond compact according to the present invention.

FIG. 5 shows a second embodiment of this invention. In this embodiment, the polycrystalline diamond layer 16 is composed of a plurality of concentric rings 17, 18, 19, and 20, each containing a different average diamond particle size. Although four rings 17, 18, 19 and 20 are depicted by example, there can be any number of concentric rings and each ring 17, 18, 19, 20 could contain a different average diamond particle size or the same average particle size could alternate in every other ring.

Figure 6:
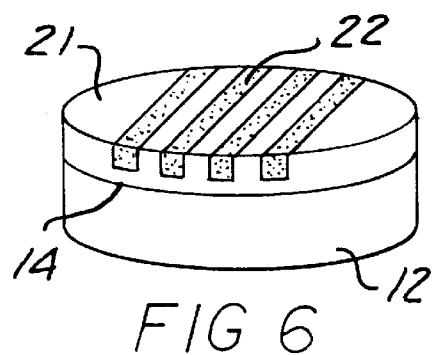
FIG. 6 is a perspective view of a third embodiment of a polycrystalline diamond compact according to the present invention.

FIG. 6 shows a third embodiment of this invention. In this embodiment, the polycrystalline diamond layer 21 has an average particle size different, i.e., less than that of parallel strips 22 of diamond which are inlaid in the face or end surface of the layer 21.

Figure 7A:
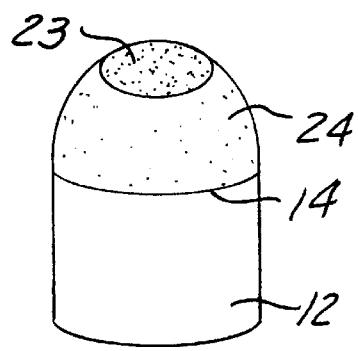
FIGS. 7A and 7B are perspective and cross-sectional views of a fourth embodiment of a polycrystalline diamond compact according to the present invention.
Figure 7B:
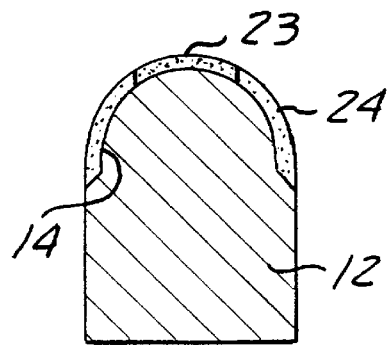

FIGS. 7A and 7B depict a non-planar end PCD embodiment wherein the polycrystalline diamond area 23 has an average particle size that is different, i.e., larger, by example only, than that of the adjacent radially outward diamond area 24. The non-planar end may be hemispherical, domed, frusto-conical, curved, etc.

Figure 8:
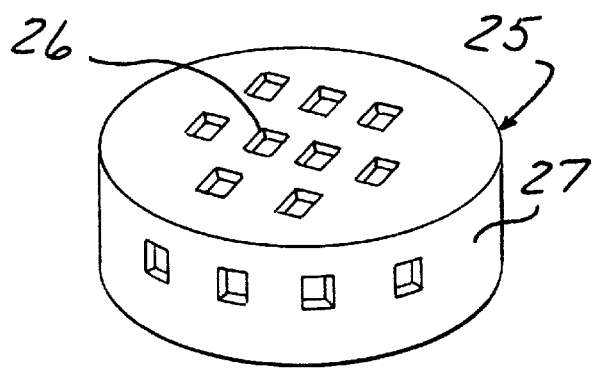
FIG. 8 is a perspective view of a fifth embodiment of a polycrystalline diamond compact according to the present invention.

The PCD 25 in the embodiment of FIG. 8 shows the use of discrete areas 26 of polycrystalline diamond with different average particle sizes wherein the areas 26 are not directly adjacent to each other. In this example, the polycrystalline diamond is isolated by the areas or pockets 26 which are formed in a tungsten carbide substrate 27. The pockets 26 may take any shape and be located in any position on the working surface of the substrate.

Figure 9:
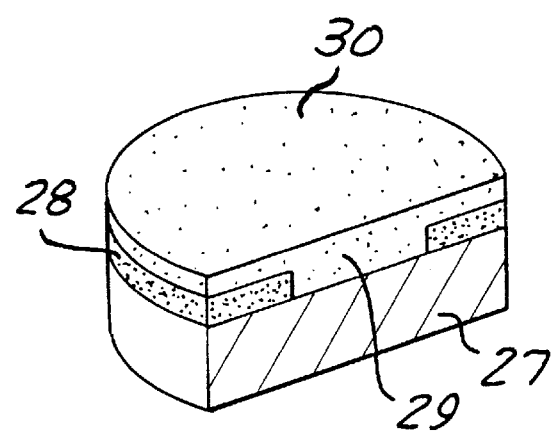
FIG. 9 is a partially broken, cross sectional view of a sixth embodiment of a polycrystalline diamond compact according to the present invention.

In the embodiment depicted in FIG. 9, inner and outer concentric rings 28 and 29, similar to the rings 10 and 11 shown in FIG. 3, are supported by the substrate 27. The layers 28 and 29 are overcoated or covered by another layer 30 of polycrystalline diamond which has a uniform crystal or particle size. Although the outer or overcoat layer 30 may be separate from either of the layers 28 and 29, it is also possible, within the scope of the present invention, to form the outer overcoat layer 30 simultaneously and integrally with one of the inner and outer layers, such as the inner layer 29 as of the embodiment shown in FIG. 9.

Figure 10:
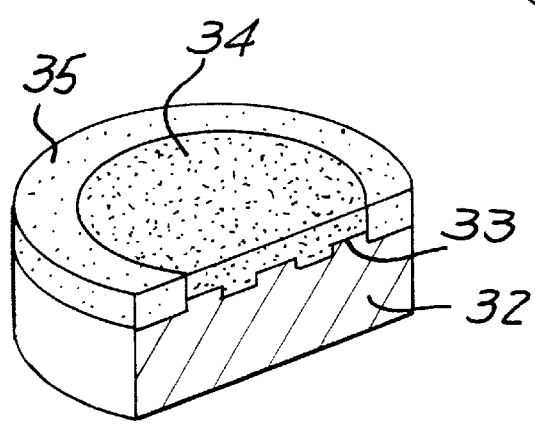
FIG. 10 is a partially broken, cross section view of a modification to the polycrystalline diamond compact depicted in FIG. 4.

FIG. 10 depicts a modification of the embodiment shown in FIG. 4 in which the substrate 32 is formed with a plurality of equally spaced, generally parallel grooves 33 at the diamond/carbide interface. The grooves 33, which may be straight sided as shown in FIG. 10 or formed with angled or other non-planar side walls, are formed only over the extent of an inner ring 34. The interface between the substrate 32 and an outer ring 35 is generally planar.

Figure 11:
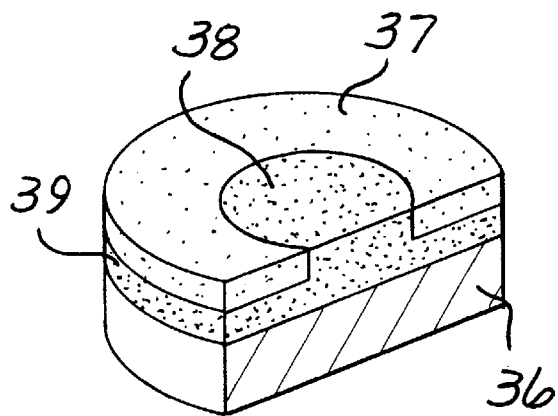
FIG. 11 is a partially broken, cross-sectional view of a seventh embodiment of a polycrystalline diamond compact according to the present invention.

FIG. 11 depicts another embodiment which is described hereafter as example 2. In this embodiment, first and second concentric areas 37 and 38 of polycrystalline diamond having different average particle sizes, such as 25 and 40 microns, are arranged in one layer. A second layer 39 is disposed between the first and second layers 37 and 38 and a substrate 36. The second layer 39 is mounted on a cobalt cemented, tungsten carbide substrate 36. The inner area 38 can be an extension of the second layer 39 and have the same average particle sizes as the second layer 39 or have an average particle size different from the first area 37 or the second layer 39.

EXAMPLES

1. A one-quarter inch diameter spacer is centered in a one-half inch diameter molybdenum cup. Then a 468 milligram sample of 25 micron diamond powder is placed in the space between the spacer and the wall of the molybdenum cup. The spacer is then carefully removed leaving a hole in the diamond layer. A 32 milligram sample of 40 micron diamond powder is then added to fill the hole in the first diamond layer. Finally a cobalt cemented tungsten carbide substrate is placed into the cup on top of the diamond powder. This assembly is loaded into a high pressure cell and pressed to 45 K-bars for fifteen minutes at 1450° C. After cutting the power to the cell and allowing the cell to cool at high pressure for one minute, the pressure is released. The composite bodies are removed from the other cell components and then lapped and ground to final dimensions.

2. A one-quarter inch diameter spacer is centered in a one-half inch diameter molybdenum cup. Then a 250 milligram sample of 25 micron diamond powder is placed in the space between the spacer and the wall of the molybdenum cup. The spacer is then carefully removed leaving a hole in the diamond layer. A 250 milligram sample of 40 micron diamond powder is then added to fill the hole in the first diamond layer and to form a cap over the first layer. Finally, a cobalt cemented tungsten carbide substrate is placed into the cup on top of the diamond powder. This assembly is loaded into a high pressure cell and pressed to 45 K-bars for fifteen minutes at 1450° C. After cutting the power to the cell and allowing the cell to cool at high pressure for one minute, the pressure is released. The composite bodies are removed from the other cell components and then lapped and ground to final dimension.

3. A 250 milligram sample of 40 micron diamond powder is placed into a one-half inch molybdenum cup. The layer is leveled by tamping with a solid steel rod. Next, a one-quarter inch diameter spacer is carefully placed on top of this diamond layer. A 234 milligram sample of 25 micron diamond powder is placed in the space between the spacer and the wall of the molybdenum cup. The spacer is then carefully removed, leaving a hole in the diamond layer. A 16 milligram sample of 40 micron diamond powder is then added to fill the hole in the first diamond layer. Finally, a cobalt cemented tungsten carbide substrate is placed into the cup on top of the diamond powder. This assembly is loaded into a high pressure cell pressed to 45 K-bars for fifteen minutes at 1450° C. After cutting the power to the cell and allowing the cell to cool at high pressure for one minute, the pressure is released. The composite bodies are removed from the other cell components and then lapped and ground to final dimensions. This example corresponds to the embodiment shown in FIG. 9 and described above.

What is claimed is:

1. A cutting element comprising:
   a polycrystalline diamond layer bonded to a substrate at an interface, a plurality of laterally adjacent contacting areas formed across the polycrystalline diamond layer, each area containing different average size diamond particles than the adjacent contacting area; and
   an outer layer of polycrystalline diamond material overcoated on an outer end surface of the plurality of areas in the polycrystalline diamond layer.

2. The cutting element of claim 1 wherein the plurality of areas include at least two areas.

3. The cutting element of claim 2 wherein the at least two areas comprise two concentric areas.

4. The cutting element of claim 1 wherein:
   each area contains different average size diamond particles than the average size diamond particles in all other areas.

5. The cutting element of claim 1 wherein the plurality of areas comprises:
   at least three laterally spaced areas across the polycrystalline diamond layer; and
   two of the plurality of spaced areas have the same average size diamond particles.

6. The cutting element of claim 1 wherein the polycrystalline diamond layer has a planar outer end surface.

7. The cutting element of claim 1 wherein:
   the polycrystalline diamond layer has a non-planar outer end surface.

8. The cutting element of claim 1 wherein the interface between the polycrystalline diamond layer and the substrate is planar.

9. The cutting element of claim 1 wherein the interface between the polycrystalline diamond layer and the substrate is formed of mating surface irregularities.

10. The cutting element of claim 1 wherein the plurality of areas comprise:
   a plurality of parallel strips of polycrystalline diamond inlaid from an end surface of the polycrystalline diamond layer;
   the plurality of strips separated by polycrystalline diamond of a different uniform average particle size.

11. The cutting element of claim 10 wherein the polycrystalline diamond in each of the parallel strips has a uniform average particle size.

12. The cutting element of claim 1 wherein:
   the outer layer of polycrystalline diamond material is unitarily formed with at least one of the areas of different average size particles.

13. A cutting element comprising a cemented tungsten carbide substrate with multiple polycrystalline diamond layers wherein at least one layer is divided into at least two laterally disposed contacting areas, each area containing different average size diamond particles from the adjacent contacting area.

* * * * *